(12) United States Patent
Sievers-Engler

(10) Patent No.: US 11,454,615 B2
(45) Date of Patent: Sep. 27, 2022

(54) QUICK LIQUID EXCHANGE IN LIQUID CHROMATOGRAPHY

(71) Applicant: Roche Diagnostics Operations, Inc., Indianapolis, IN (US)

(72) Inventor: Adrian Sievers-Engler, Muensingen (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 391 days.

(21) Appl. No.: 15/931,152

(22) Filed: May 13, 2020

(65) Prior Publication Data

US 2020/0386721 A1    Dec. 10, 2020

(30) Foreign Application Priority Data

Jun. 4, 2019    (EP) .................................... 19178228

(51) Int. Cl.
| | | |
|---|---|---|
| G01N 30/02 | (2006.01) | |
| F04B 49/06 | (2006.01) | |
| F04B 49/08 | (2006.01) | |
| G01N 30/32 | (2006.01) | |

(52) U.S. Cl.
CPC ........... G01N 30/02 (2013.01); F04B 49/065 (2013.01); F04B 49/08 (2013.01); *F04B 2205/05* (2013.01); *G01N 2030/027* (2013.01); *G01N 2030/326* (2013.01)

(58) Field of Classification Search
CPC ............. G01N 30/02; G01N 2030/027; G01N 2030/326; G01N 30/34; G01N 30/32; G01N 30/16; F04B 49/065; F04B 49/08; F04B 2205/05
See application file for complete search history.

(56) References Cited

U.S. PATENT DOCUMENTS

| | | | |
|---|---|---|---|
| 4,681,513 A | 7/1987 | Saito et al. | |
| 2010/0237235 A1* | 9/2010 | Ozbal | G01N 30/7266 |
| | | | 250/288 |
| 2015/0345484 A1 | 12/2015 | Doebelin | |

(Continued)

FOREIGN PATENT DOCUMENTS

| | | |
|---|---|---|
| EP | 655769 A1 | 11/1994 |
| EP | 3136095 B1 | 3/2018 |

(Continued)

*Primary Examiner* — Francis C Gray
(74) *Attorney, Agent, or Firm* — Roche Diagnostics Operations, Inc.

(57) ABSTRACT

A liquid chromatographic (LC) system and a method of exchanging a liquid in an LC system are disclosed. The LC system includes an LC pump with at least one pump head having a primary and a secondary pump head, each with a syringe-like cylinder body having an inner wall surface and a plunger translatable through the cylinder body leaving an interspace between the inner wall surface and the plunger when the plunger is translated through the cylinder body, an upstream inlet valve configured to allow liquid into the cylinder body and a downstream outlet valve configured to allow liquid out of the cylinder body. The LC system further includes at least one liquid-exchange pump connected either to the upstream inlet valve of the primary pump head or to the downstream outlet valve of the secondary pump head.

15 Claims, 7 Drawing Sheets

(56) References Cited

U.S. PATENT DOCUMENTS

| | | |
|---|---|---|
| 2018/0292368 A1 | 10/2018 | Franz et al. |
| 2020/0064314 A1* | 2/2020 | Sievers-Engler ...... G01N 30/22 |
| 2020/0400623 A1* | 12/2020 | Plachetka .............. G01N 30/34 |

FOREIGN PATENT DOCUMENTS

| | | | | |
|---|---|---|---|---|
| EP | 3896443 A1 * | 10/2021 | | |
| GB | 2338433 A | 12/1999 | | |
| JP | H10-339267 A | 12/1998 | | |
| JP | 2002-168843 A | 6/2002 | | |
| JP | W02019220563 A1 * | 11/2019 | | |
| JP | 6809644 B2 * | 1/2021 | ............. | F04B 23/04 |
| WO | 2009/062538 A1 | 5/2009 | | |
| WO | 2018/055866 A1 | 3/2018 | | |

\* cited by examiner

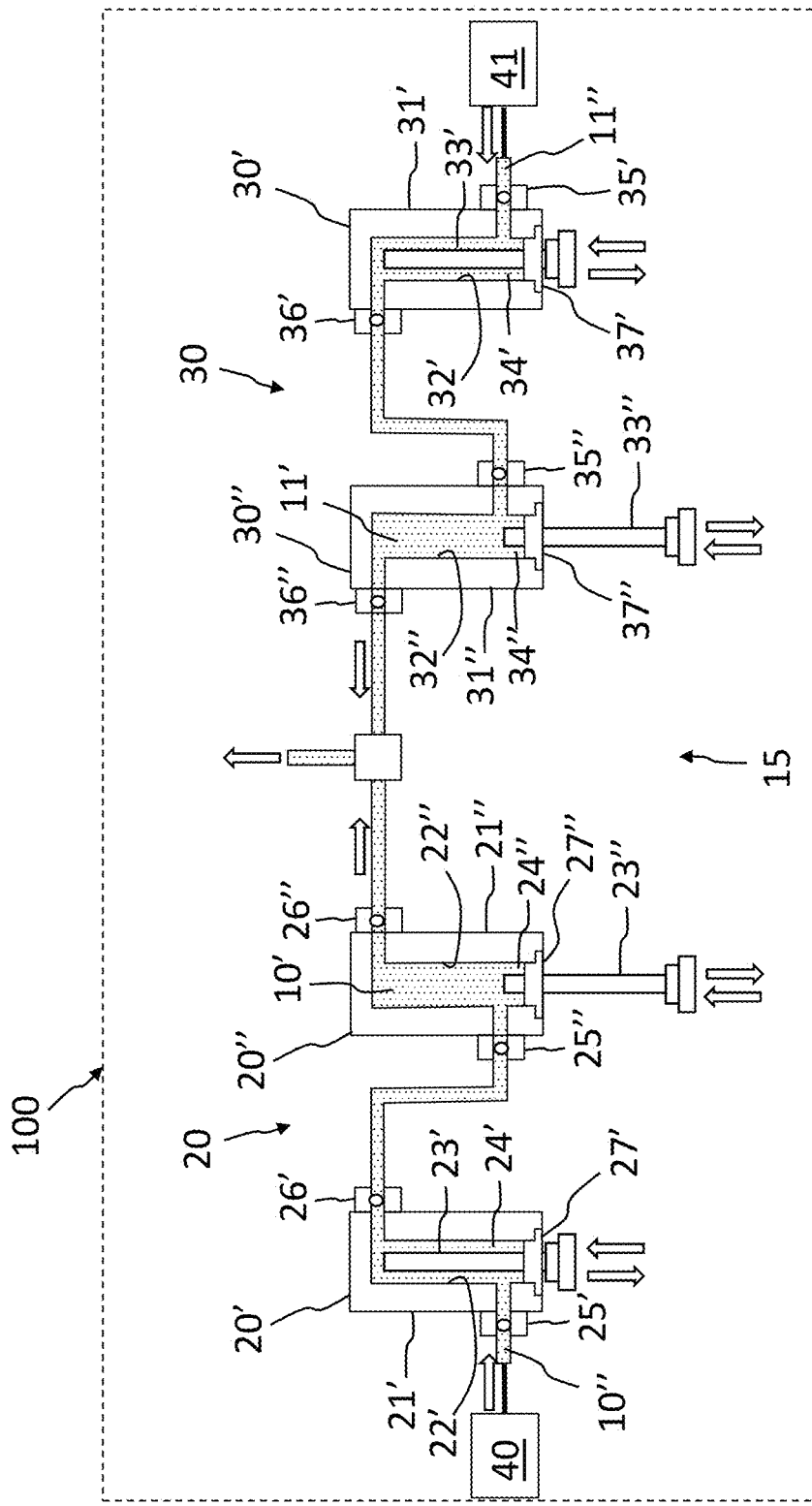
FIG. 1 – PRIOR ART

QUICK LIQUID EXCHANGE IN LIQUID CHROMATOGRAPHY

CROSS-REFERENCE TO RELATED APPLICATIONS

This application claims priority to European Patent Application No. 19178228.3, filed 4 Jun. 2019, the disclosure of which is hereby incorporated by reference in its entirety.

FIELD OF THE DISCLOSURE

The present disclosure is related to a system and to a method for liquid exchange in liquid chromatography.

BACKGROUND

There is growing interest for the implementation of mass spectrometry and more specifically of liquid chromatography coupled to mass spectrometry in the clinical laboratory. However, the lack of standardized and automated procedures and the complexity of the analytical setup limit its implementation. In particular, sample preparation is typically a manual and tedious procedure. Protein precipitation with subsequent centrifugation is the most popular method to remove unwanted and potentially disturbing sample matrix. The use of kits may in part facilitate sample preparation that can be at least in part automated. Kits are however available only for a limited number of analytes of interest, and the entire process from sample preparation to separation and detection remains complex, requiring the attendance of highly trained laboratory personnel to run highly sophisticated instruments.

Also, typically, a batch approach is followed, where a batch of samples prepared in advance under the same preparation conditions undergo consecutive chromatographic separation runs under the same separation conditions. This approach however does not enable high throughput and is not flexible, e.g., does not allow processing samples in random order and does not allow re-scheduling (changing a pre-defined processing sequence) in view of, for example, incoming emergency samples that have higher priority and have to be processed first.

For high-throughput applications requiring many consecutive sample injection cycles, and especially for random-access analysis of different samples possibly requiring different injection conditions and different LC separation conditions, even more flexibility and speed in quickly changing and adapting the conditions for each sample in a scheduled sequence, is important.

In particular, it may be required to frequently exchange solvent/eluent used for the LC separations. Typically, solvent/eluent exchange in liquid chromatography is done by repeated filling of pump cylinders and subsequent expelling of the liquid. Due to the nature of pump action and to internal dead volumes, liquid exchange is a process of repeated dilution of the previously used liquid by the newly used liquid. This process is time consuming, requiring up to several minutes, and therefore represents a bottleneck if the goal is to achieve high-throughput random-access sample processing.

Moreover, liquid exchange is typically associated with a temporary loss of liquid pressure, which may reduce LC column lifetime and chromatographic performance.

SUMMARY

It is against the above background that the embodiments of the present disclosure provide certain unobvious advantages and advancements over the prior art. In particular, the inventors have recognized a need for improvements in quick liquid exchange in liquid chromatography.

Although the embodiments of the present disclosure are not limited to specific advantages or functionality, it is noted that the present disclosure allows for a liquid chromatographic (LC) system and a method of exchanging a liquid in a liquid chromatographic system which enable quicker liquid exchange in liquid chromatography and therefore enable high-throughput random-access liquid chromatography, eventually coupled to mass spectrometry. Another advantage of the system and method herein disclosed is that a loss of liquid pressure during liquid exchange can be prevented, thereby extending LC column lifetime and improving chromatographic performance.

In accordance with one embodiment of the disclosure, a liquid chromatographic (LC) system is provided comprising a liquid chromatography pump comprising at least one pump head comprising a primary pump head and a secondary pump head, each comprising a syringe-like cylinder body having an inner wall surface and a plunger translatable through the cylinder body leaving an interspace between the inner wall surface and the plunger when the plunger is translated through the cylinder body, an upstream inlet valve configured to allow liquid into the cylinder body and a downstream outlet valve configured to allow liquid out of the cylinder body, the downstream outlet valve of the primary pump head being connected to the upstream inlet valve of the secondary pump head. The LC system further comprises at least one liquid-exchange pump connected either to the upstream inlet valve of the primary pump head or to the downstream outlet valve of the secondary pump head, wherein said at least one liquid-exchange pump is configured for exchanging a liquid present in the cylinder bodies of the primary and the secondary pump heads with another liquid by purging through the interspaces left between the inner wall surfaces of the cylinder bodies and the plungers, respectively.

In accordance with another embodiment of the disclosure, a method of exchanging a liquid in a liquid chromatographic (LC) system is provided comprising a liquid chromatography pump comprising at least one pump head comprising a primary pump head and a secondary pump head, each comprising a syringe-like cylinder body having an inner wall surface and a plunger translatable through the cylinder body leaving an interspace between the inner wall surface and the plunger when the plunger is translated through the cylinder body, an upstream inlet valve configured to allow liquid into the cylinder body and a downstream outlet valve configured to allow liquid out of the cylinder body, the downstream outlet valve of the primary pump head being connected to the upstream inlet valve of the secondary pump head. The method further comprises exchanging the liquid present in the cylinder bodies of the primary and the secondary pump heads with another liquid by purging through the interspaces left between the inner wall surfaces of the cylinder bodies and the plungers, respectively, by at least one liquid-exchange pump connected either to the upstream inlet valve of the primary pump head, or to the downstream outlet valve of the secondary pump head.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIG. 1 shows schematically a liquid chromatographic system and a method of exchanging liquid in a liquid chromatographic system according to the prior art;

Figure 2A:
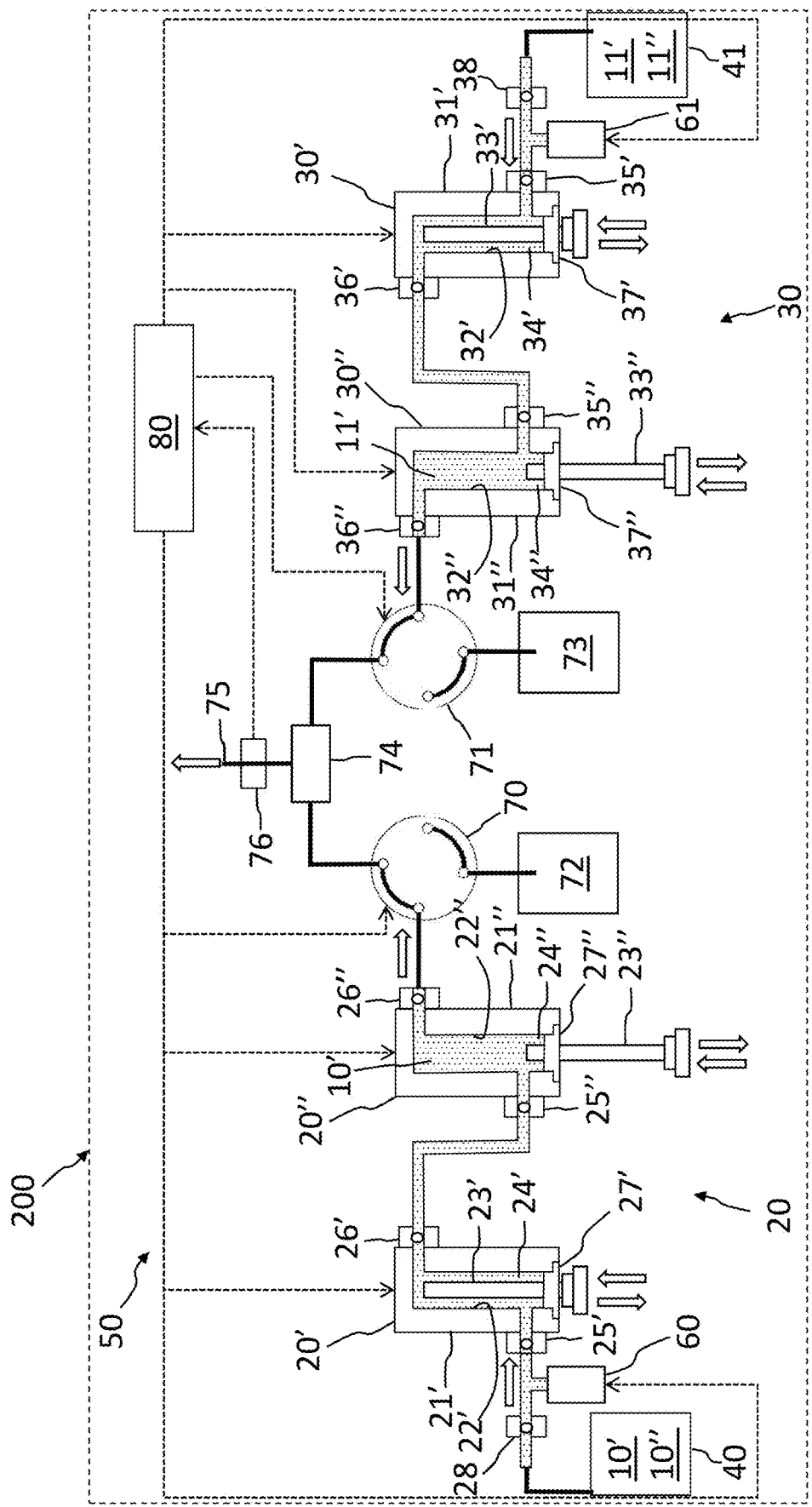
FIG. 2A shows schematically a liquid chromatographic system and a method of exchanging liquid in the liquid chromatographic system according to a first embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

"Liquid chromatography or LC" is an analytical process that subjects samples injected by a sample injector to chromatographic separation through a LC column in order for example to separate analytes of interest from matrix components, e.g., remaining matrix components after sample preparation that may still interfere with a subsequent detection, e.g., a mass spectrometry detection, and/or in order to separate analytes of interest from each other in order to enable their individual detection. "High-performance liquid chromatography" or HPLC, "ultra-high-performance liquid chromatography" or UHPLC, "micro liquid chromatography" or μLC and "small-bore liquid chromatography" or small-bore LC are forms of liquid chromatography performed under pressure.

A "liquid chromatographic system or LC system" is an analytical apparatus or module or a unit in an analytical apparatus for carrying out liquid chromatography. The LC system may be embodied as a single channel or as a multi-channel system that may comprise one or a plurality of LC columns arranged in parallel and/or in series. The LC system may also comprise elements such as a sample injector, valves, liquid sources, fluidic connections and parts, e.g., for mixing liquids, degassing liquids, tempering liquids, and the like, one or more sensors, such as pressure sensors, temperature sensors and the like, and especially at least one LC pump. The list is not exhaustive. According to an embodiment, the LC system is an analytical module designed to prepare a sample for mass spectrometry and/or to transfer a prepared sample to a mass spectrometer, in particular for separating analytes of interest before detection by a mass spectrometer. In particular, typically, during an LC run, the mass spectrometer may be set to scan a specific mass range. LC/MS data can be represented by adding up the ion current in the individual mass scans and plotting that "totaled" ion current as an intensity point against time. The resulting plot looks like an HPLC UV trace with analyte peaks. The LC system may otherwise comprise a detector of its own such as a UV detector.

An "LC channel" is a fluidic line comprising at least one capillary tubing and/or LC column comprising a stationary phase selected according to the type of sample(s) and analytes and through which a mobile phase is pumped in order to trap and/or separate and elute and/or transfer analytes of interest under selected conditions, e.g., according to their polarity or log P value, size or affinity, as generally known. The at least one LC column in the at least one LC channel may be exchangeable. In particular, the LC system may comprise more LC columns than LC channels, where a plurality of LC columns may be interchangeably coupled to the same LC channel Capillary tubing may be also used to bypass LC columns.

An "LC column" may refer to any of a column, a cartridge, a capillary and the like for performing separations of a chromatographic nature. Columns are typically packed or loaded with a stationary phase, through which a mobile phase is pumped in order to trap and/or separate and elute and/or transfer analytes of interest under selected conditions, e.g., according to their polarity or log P value, size or affinity, as generally known. This stationary phase can be particulate or beadlike or a porous monolith. However, the term "column" may also refer to capillaries which are not packed or loaded with a stationary phase but rely on the surface area of the inner capillary wall to effect separations. The LC column may be exchangeable and/or operate in parallel or in sequence to one or more other LC columns. An LC column may be for example a rapid trap and elute online LC column, a high-performance LC (HPLC) column or an ultra-high-performance LC (UHPLC) column, and may be of any size, including micro-LC columns and small-bore LC columns with an inner diameter of less than 1 mm.

A "liquid chromatography pump or LC pump" is a high-pressure pump that may vary in pressure capacity but that can yield a consistent and reproducible volumetric flow rate though an LC channel Pressure in HPLC may typically reach as high as 60 MPa or about 600 atmospheres, whereas UHPLC and μ-LC systems have been developed to work at even higher pressures, e.g., up to 140 MPa or about 1400 atmospheres, and therefore are able to use much smaller particle sizes in the LC columns (<2 μm). LC pumps may be configured as binary pumps, e.g., in case of conditions requiring the use of elution gradients.

According to one embodiment, the LC pump can yield a pressure of 60 MPa to 140 MPa, e.g., 75 MPa to 100 MPa, e.g., 80 MPa.

According to one embodiment, the LC pump can be configured to operate with a flow rate between 1 μl/min and 500 μl/min or more, and typically operates at flow rates between 100 μl/min to 300 μl/min, and an accuracy of, e.g., about ±5% or less.

The LC pump may comprise more than one pump head. For example, binary pumps comprise two pump heads and each pump head typically comprises a primary pump head and a secondary pump head cooperating with each other for pumping liquid while maintaining the liquid pressure inside the pump head about constant. In particular, each of the primary pump head and of the secondary pump head is typically a syringe-like pump comprising a syringe-like cylinder body having an inner wall surface and a plunger translatable through the cylinder body leaving an interspace between the inner wall surface and the plunger when the plunger is translated through the cylinder body. Also, each of the primary pump head and of the secondary pump head comprises a one-way upstream inlet valve configured to allow liquid into the cylinder body and preventing liquid from getting out through the same valve, and a one-way downstream outlet valve configured to allow liquid out of the cylinder body and preventing liquid from getting into the cylinder body through the same valve. The downstream outlet valve of the primary pump head is connected to the upstream inlet valve of the secondary pump head, whereas the upstream inlet valve of the primary pump head is connected to a liquid source. In this way, liquid can flow from the liquid source into the primary pump head through the upstream inlet valve of the primary pump head, and out of the primary pump head into the secondary pump head through the downstream outlet valve of the primary pump head and the upstream inlet valve of the secondary pump head, and out of the secondary pump head through the downstream outlet valve of the secondary pump head, by reciprocating action and translation of the plungers of the primary pump head and of the secondary pump head, respectively, through liquid-tight seals.

A "liquid-exchange pump" is an auxiliary pump distinguished at least in function from the LC pump, the main or sole function being that to facilitate and to speed up liquid exchange within the pump head(s) of the LC pump. In general, the liquid-exchange pump is a lower-pressure and higher-volume (higher-flow-rate) pump compared to the LC pump and is fluidically connected either to the upstream inlet valve of the primary pump head or to the downstream outlet valve of the secondary pump head, for exchanging a liquid present in the cylinder bodies of the primary and the secondary pump heads with another liquid by purging through the interspaces left between the inner wall surfaces of the cylinder bodies and the plungers, respectively. Typically, the liquid-exchange pump according to the present disclosure is also a lower-precision pump and hence also simpler and cheaper in construction compared to an LC pump.

The term "liquid" refers to liquids commonly used in liquid chromatography, e.g., as solvents or mixtures of solvents used, e.g., as mobile phases or eluents, and as known in the art.

According to an embodiment, the LC pump is a binary pump comprising a first pump head comprising a first primary pump head and a first secondary pump head, and a second pump head comprising a second primary pump head and a second secondary pump head, respectively. The downstream outlet valve of the first secondary pump head and the downstream outlet valve of the second secondary pump head are connected to a first purge switch valve and to a second purge switch valve, respectively, and the first and the second purge switch valves are individually connected to a waste and also to each other via a junction and to an analytical input via the junction.

According to an embodiment, the LC system comprises a first positive-pressure liquid-exchange pump connected to the upstream inlet valve of the first primary pump head and a second positive-pressure liquid-exchange pump connected to the upstream inlet valve of the second primary pump head, respectively. Any liquid-exchange pumps suitable to generate a positive-pressure in order to actively pump liquid from respective liquid sources into the respective first and second pump heads via the respective upstream inlet valves of the first primary pump head and second primary pump head, respectively, may be used, like for example membrane/diaphragm pumps, single-plunger high-speed pumps, syringe-piston pumps, gear pumps and the like. According to an embodiment, positive pressure and active pumping may be achieved by applying pneumatic pressure, e.g., by pressurized gas, e.g., by a nitrogen supply, into a sealed liquid container connected to the upstream inlet valve.

According to an embodiment, the LC system comprises a first negative-pressure liquid-exchange pump connected to the downstream outlet valve of the first secondary pump head via the first purge switch valve and a second negative-pressure liquid-exchange pump connected to the downstream outlet valve of the second secondary pump head via the second purge switch valve, respectively. Any liquid-exchange pumps suitable to generate a negative-pressure (vacuum source) in order to aspirate liquids from respective liquid sources connected to the respective upstream inlet valves of the first primary pump head and second primary pump head, respectively, may be used, analogously to the positive-pressure liquid-exchange pumps. Advantageously, a waste may be placed between the first purge switch valve and the first positive-pressure liquid-exchange pump, and between the second purge switch valve and the second positive-pressure liquid-exchange pump, respectively, in order to trap liquids being replaced into the respective waste.

According to an embodiment, the LC system comprises a software-driven controller and a pressure sensor cooperating with each other for alternating liquid exchange between the first pump head and the second pump head while maintaining the pressure at the analytical input constant or within a predetermined range.

According to an embodiment, the controller is programmed to switch the first purge switch valve and the second purge switch valve in order to divert liquid from the pump head where liquid is being exchanged to waste, and liquid from the other pump head to the analytical input.

According to an embodiment, the LC pump is a binary pump comprising a first pump head comprising a first primary pump head and a first secondary pump head, and a second pump head comprising a second primary pump head and a second secondary pump head, respectively. However, the downstream outlet valve of the first secondary pump head and the downstream outlet valve of the second secondary pump head are connected via a junction to a common purge switch valve, the common purge switch valve comprising a junction inlet port connected to the junction, two bypass ports interconnected by a bypass fluidic path, two liquid-exchange pump ports interconnected by a common liquid exchange pump, and an output port.

According to an embodiment, the output port is connected to a flow splitter for diverting part of the liquid to waste and part of the liquid to an analytical input.

According to an embodiment, the LC system comprises a software-driven controller cooperating with a pressure sensor and programmed to regulate the flow splitter for enabling simultaneous liquid exchange at both the first pump head and the second pump head while maintaining the pressure at the analytical input constant or within a predetermined range.

According to an embodiment, the controller is further programmed to switch the common purge switch valve in order to alternately connect the junction inlet port and the output port via the bypass ports and via the liquid-exchange pump ports, respectively.

The term "valve" refers to a flow-regulating device to control, redirect, restrict or stop flow. For example, the upstream inlet valve(s) and the downstream outlet valve(s)

as already mentioned are one-way valves configured to allow liquid into and out of the cylinder bodies of the pump head in only one direction, i.e., from upstream to downstream, and preventing liquid from flowing in the opposite direction.

A "purge switch valve" is an LC switching valve, that is a multi-port valve that controls flow between elements connected to the ports. This is typically achieved by moving one or more valve conduits to switch communication between different elements. Elements may be fluidically connected to the ports via further conduits, like pipes, tubes, capillaries, microfluidic channels and the like, and by fittings like screws/nuts and ferrules, or alternative liquid-tight seals, e.g., maintained in place by a clamp mechanism. An LC switching valve is normally capable of allowing liquid pressures in the order of magnitude used for HPLC or higher. In particular, a purge switch valve comprises a purge port connected to a waste.

According to an embodiment, the purge switch valve has an inner valve conduit(s) with an inner diameter of less than 0.6 mm, e g, between about 0.5 mm and 0.2 mm, e.g., about 0.4 mm or about 0.25 mm.

According to an embodiment, the purge switch valve has a switching time of about 500 ms or less.

The term "flow splitter" refers to a device that based on pressure feedback from a pressure sensor can vary the relative flow rate between two fluidic lines in order to maintain the liquid pressure within one of the fluidic lines constant or within a predetermined range. Typically, one of the fluidic lines is connected to a waste and the other fluidic line to an analytical input. The term "analytical input" refers to fluidic connection to an analytical part of an LC channel, comprising, e.g., a sample injector, comprising, e.g., a sample loop, and/or an LC column.

The term "software-driven controller" as used herein encompasses any physical or virtual processing device and in particular a programmable logic controller running a computer-readable program provided with instructions to perform operations in accordance with an operation plan and in particular associated with operation of the liquid exchange pumps in order to alternate liquid exchange between the first pump head and the second pump head while maintaining the pressure at the analytical input constant or within a predetermined range, taking eventually into account readouts from one or more pressure sensors, and switching purge switch valves and/or regulating a flow splitter as needed in an automated manner.

The controller may be a separate logic entity in communication with the LC system. In some embodiments, the controller might be integral with a data management unit, may be comprised by a server computer and/or be part of one clinical diagnostic system or even distributed across a plurality of LC systems.

The controller may be also configurable to control the LC system in a way that workflow(s) and workflow step(s) are conducted by the LC system.

In particular, the controller may communicate and/or cooperate with a scheduler and/or data manager in order to take into account incoming analysis orders and/or received analysis orders and a number of scheduled process operations associated with the execution of the analysis orders in order to schedule and execute liquid exchange.

The present disclosure also refers to a method of exchanging a liquid in an LC system comprising an LC pump comprising at least one pump head comprising a primary pump head and a secondary pump head, each comprising a syringe-like cylinder body having an inner wall surface and a plunger translatable through the cylinder body leaving an interspace between the inner wall surface and the plunger when the plunger is translated through the cylinder body, an upstream inlet valve configured to allow liquid into the cylinder body and a downstream outlet valve configured to allow liquid out of the cylinder body, the downstream outlet valve of the primary pump head being connected to the upstream inlet valve of the secondary pump head. The method comprises exchanging the liquid present in the cylinder bodies of the primary and the secondary pump heads with another liquid by purging through the interspaces left between the inner wall surfaces of the cylinder bodies and the plungers, respectively, by at least one liquid-exchange pump connected either to the upstream inlet valve of the primary pump head or to the downstream outlet valve of the secondary pump head.

According to an embodiment, the liquid chromatography pump is a binary pump comprising a first pump head comprising a first primary pump head and a first secondary pump head, and a second pump head comprising a second primary pump head and a second secondary pump head, respectively, and where the downstream outlet valve of the first secondary pump head and the downstream outlet valve of the second secondary pump head are connected to a first purge switch valve and to a second purge switch valve, respectively, and the first and the second purge switch valves are individually connected to a waste and also to each other via a junction and to an analytical input via the junction, and the method comprises alternating liquid exchange between the first pump head and the second pump head while maintaining the pressure at the analytical input constant or within a predetermined range by a software-driven controller cooperating with a pressure sensor.

According to an embodiment, the method comprises switching the first purge switch valve and the second purge switch valve in order to divert liquid from the pump head where liquid is being exchanged to waste, and liquid from the other pump head to the analytical input.

According to an embodiment, the liquid chromatography pump is a binary pump comprising a first pump head comprising a first primary pump head and a first secondary pump head, and a second pump head comprising a second primary pump head and a second secondary pump head, respectively, and where the downstream outlet valve of the first secondary pump head and the downstream outlet valve of the second secondary pump head are connected via a junction to a common purge switch valve, the common purge switch valve comprising a junction inlet port connected to the junction, two bypass ports interconnected by a bypass fluidic path, two liquid-exchange pump ports interconnected by a common liquid exchange pump, and an output port connected to a flow splitter for diverting part of the liquid to waste and part of the liquid to an analytical input, and the method comprises regulating the flow splitter for enabling simultaneous liquid exchange at both the first pump head and the second pump head while maintaining the pressure at the analytical input constant or within a predetermined range by a software-driven controller cooperating with a pressure sensor.

According to an embodiment, the method comprises switching the common purge switch valve in order to alternately connect the junction inlet port and the output port via the bypass ports and via the liquid-exchange pump ports, respectively.

Other and further objects, features and advantages will appear from the following description of exemplary embodiments in combination with the drawings and the accompanying claims. It is noted that the scope of the claims is defined by the recitations therein and not by the specific discussion of features and advantages set forth in the present description.

FIG. 1 shows schematically a liquid chromatographic system 100 and a method of exchanging liquid 10', 10" with another liquid 11', 11", respectively, in the liquid chromatographic system 100 according to the prior art. In particular, the system 100 comprises a binary liquid chromatography pump 15 comprising a first pump head 20 comprising a first primary pump head 20' and a first secondary pump head 20", and a second pump head 30 comprising a second primary pump head 30' and a second secondary pump head 30", respectively, each comprising a syringe-like cylinder body 21', 21", 31', 31", respectively, having an inner wall surface 22', 22", 32', 32" and a plunger 23', 23", 33', 33" translatable through the cylinder body 21', 21", 31', 31" leaving an interspace 24', 24", 34', 34" between the inner wall surface 22', 22", 32', 32" and the plunger 23', 23", 33', 33" when the plunger 23', 23", 33', 33" is translated through the cylinder body 21', 21", 31', 31".

Also, each of the primary pump heads 20', 30' and of the secondary pump heads 20", 30" comprises a one-way upstream inlet valve 25', 35', 25", 35" configured to allow liquids 10', 10", 11', 11" into the respective cylinder bodies 21', 21", 31', 31" and preventing liquids 10', 10", 11', 11" from getting out through the same valves 25', 35', 25", 35", and a one-way downstream outlet valve 26', 36', 26", 36" configured to allow liquids 10', 10", 11', 11" out of the respective cylinder bodies 21', 21", 31', 31" and preventing liquids 10', 10", 11', 11" from getting into the cylinder bodies 21', 21", 31', 31" through the same valves 26', 36', 26", 36", respectively. The downstream outlet valves 26', 36' of the primary pump heads 20', 30' are connected to the upstream inlet valves 25", 35" of the secondary pump heads 20", 30", respectively, whereas the upstream inlet valves 25', 35' of the primary pump head 20', 30' are connected to respective liquid sources 40, 41. In this way, liquids 10', 10", 11', 11" can flow from the liquid sources 40, 41 into the primary pump heads 20', 30' through the upstream inlet valves 25', 35' of the primary pump heads 20', 30' and out of the primary pump heads 20', 30' into the secondary pump heads 20", 30" through the downstream outlet valves 26', 36' of the primary pump heads 20', 30' and the upstream inlet valves 25", 35" of the secondary pump heads 20", 30" and out of the secondary pump heads 20", 30" through the downstream outlet valves 26", 36" of the secondary pump heads 20", 30", by reciprocating action and translation of the plungers 23', 33', 23", 33" of the primary pump heads 20', 30' and of the secondary pump heads 20", 30", respectively, through liquid-tight seals 27', 37', 27", 37".

Liquid exchange occurs by repeated filling of the pump cylinders 21', 21", 31', 31" and subsequent expelling of the previous liquids 10', 11' while drawing the new liquids 10", 11". Due to the nature of pump action and to the interspaces 24', 24", 34', 34", liquid exchange is a process of repeated dilution of the previously used liquids 10', 11' by the newly used liquids 10", 11". This process is time consuming, requiring up to several minutes, and therefore represents a bottleneck if the goal is to achieve high-throughput random-access sample processing with frequent liquid exchange.

Figure 2B:
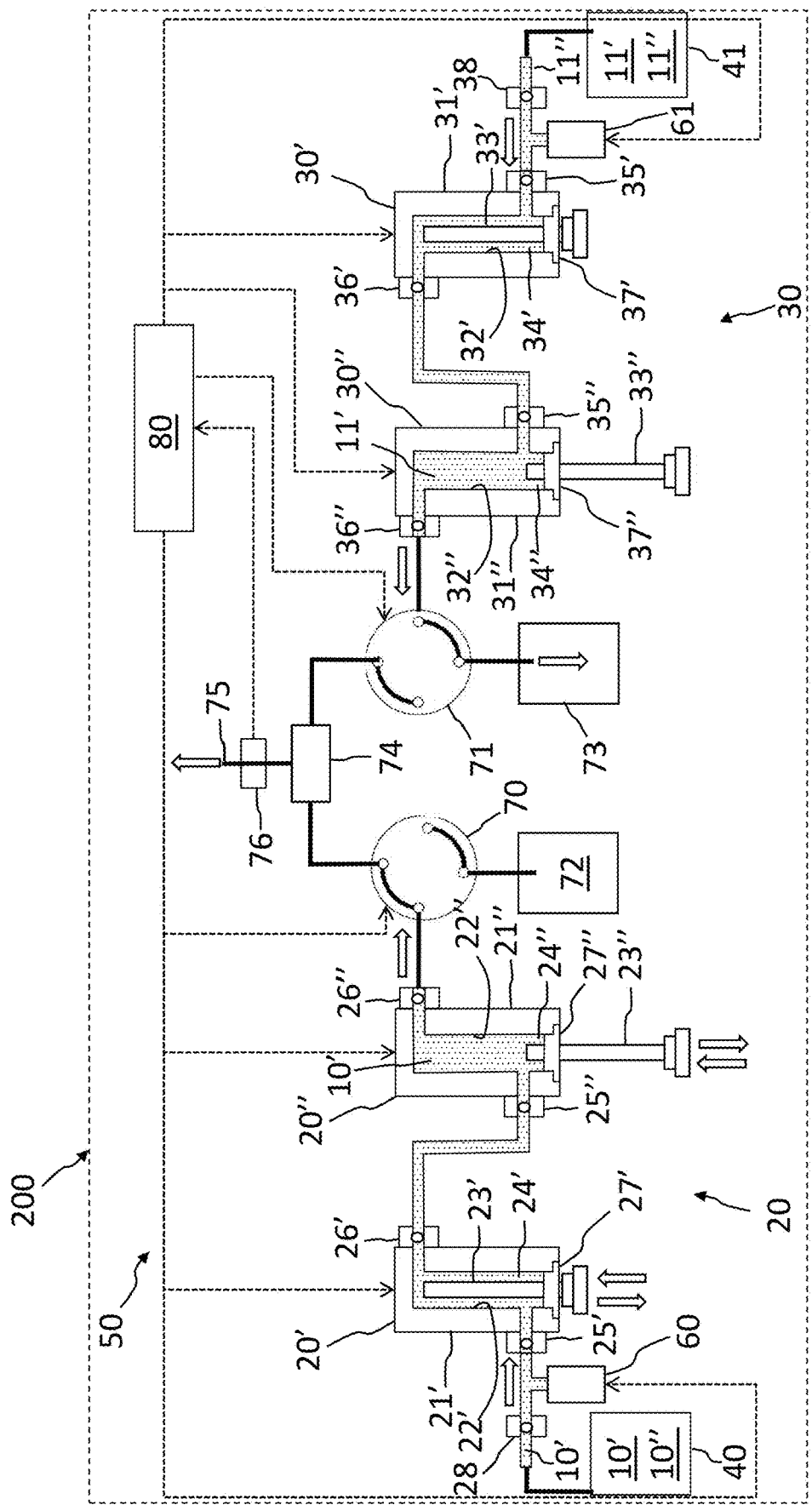
FIG. 2B is a continuation of the first embodiment of FIG. 2A.

FIGS. 2A and 2B show schematically a liquid chromatographic (LC) system 200 and a method of exchanging liquid 10', 10" with another liquid 11', 11", respectively, in the liquid chromatographic system 200 according to a first embodiment of the present disclosure. In particular, the system 200 comprises a binary liquid chromatography pump 50 comprising a first pump head 20 comprising a first primary pump head 20' and a first secondary pump head 20", and a second pump head 30 comprising a second primary pump head 30' and a second secondary pump head 30", respectively, each comprising a syringe-like cylinder body 21', 21", 31', 31", respectively, having an inner wall surface 22', 22", 32', 32" and a plunger 23', 23", 33', 33" translatable through the cylinder body 21', 21", 31', 31" leaving an interspace 24', 24", 34', 34" between the inner wall surface 22', 22", 32', 32" and the plunger 23', 23", 33', 33" when the plunger 23', 23", 33', 33" is translated through the cylinder body 21', 21", 31', 31" through a liquid-tight seal 27', 27", 37', 37", respectively.

Also, each of the primary pump heads 20', 30' and of the secondary pump heads 20", 30" comprises a one-way upstream inlet valve 25', 35', 25", 35" configured to allow liquids 10', 10", 11', 11" into the respective cylinder bodies 21', 21", 31', 31" and preventing liquids 10', 10", 11', 11" from getting out through the same valves 25', 35', 25", 35", and a one-way downstream outlet valve 26', 36', 26", 36" configured to allow liquids 10', 10", 11', 11" out of the respective cylinder bodies 21', 21", 31', 31" and preventing liquids 10', 10", 11', 11" from getting into the cylinder bodies 21', 21", 31', 31" through the same valves 26', 36', 26", 36", respectively. The downstream outlet valves 26', 36' of the primary pump heads 20', 30' are connected to the upstream inlet valves 25", 35" of the secondary pump heads 20", 30", respectively, whereas the upstream inlet valves 25', 35' of the primary pump heads 20', 30' are connected to respective liquid sources 40, 41. In this way, liquids 10', 10", 11', 11" can flow from the liquid sources 40, 41 into the primary pump heads 20', 30' through the upstream inlet valves 25', 35' of the primary pump heads 20', 30' and out of the primary pump heads 20', 30' into the secondary pump heads 20", 30" through the downstream outlet valves 26', 36' of the primary pump heads 20', 30' and the upstream inlet valves 25", 35" of the secondary pump heads 20", 30" and out of the secondary pump heads 20", 30" through the downstream outlet valves 26", 36" of the secondary pump heads 20", 30".

The LC system 200 further comprises a first liquid-exchange pump 60 connected to the upstream inlet valve 25' of the primary pump head 20' of the first pump head 20 and a second liquid-exchange pump 61 connected to the upstream inlet valve 35' of the primary pump head 30' of the second pump head 30, for exchanging the liquids present in the cylinder bodies 10', 11' of the primary and the secondary pump heads 20', 20", 30', 30" of the first and second pump heads 20, 30, respectively, with other liquids 10", 11" by purging through the interspaces 24', 24", 34', 34" left between the inner wall surfaces 22', 22", 32', 32" of the cylinder bodies 21', 21", 31', 31" and the plungers 23', 23", 33', 33", respectively.

Also, the downstream outlet valve 26" of the first secondary pump head 20" and the downstream outlet valve 36" of the second secondary pump head 30" are connected to a first purge switch valve 70 and to a second purge switch valve 71, respectively, and the first and the second purge switch valves 70, 71 are individually connected to a waste 72, 73 and also to each other via a junction 74 and to an analytical input 75 via the junction 74.

The first liquid-exchange pump 60 and the second liquid-exchange pump 61 are positive-pressure liquid exchange pumps configured to draw liquids 10", 11" from the liquid sources 40, 41 via additional one-way valves 28, 38 and actively pump the liquids 10", 11" through the first and second pump heads 20, 30, respectively, in order to exchange the liquids 10', 11' present therein.

The LC system 200 further comprises a software-driven controller 80 cooperating with a pressure sensor 76 for alternating liquid exchange between the first pump head 20 and the second pump head 30 while maintaining the pressure at the analytical input 75 constant or within a predetermined range. The controller 80 is further programmed to control operation of the first and second pump heads 20, 30 and of the liquid-exchange pumps 60, 61, e.g., by sending and/or managing on/off signals and/or operational parameters like pressure, speed, time to/for each of them at specific times according to scheduled workflow steps or plan.

In particular, as it can be seen in FIG. 2B, which is a continuation of the first embodiment of FIG. 2A, the controller 80 is further programmed to alternately switch the first purge switch valve 70 and the second purge switch valve 71 in order to divert liquid from the pump head where liquid is being exchanged to waste while liquid from the other pump head continues to flow to the analytical input 75. In FIG. 2B, it is shown as an example when the controller 80 switches the second purge switch valve 71 and operates the second positive-pressure liquid exchange pump 61 in order to divert liquid 11', 11" from the pump head 30 where liquid 11' is being exchanged with liquid 11" to waste 73, whereas liquid 10' from the other pump head 20 is sent to the analytical input 75 by reciprocating action of the plungers 23', 23" of the first pump head 20. In particular, the controller 80 may further regulate the liquid pressure by the first pump head 20 in order to maintain the liquid pressure at the analytical input 75 constant or within a predetermined range while liquid 11', 11" from the second pump head 30 is diverted to waste 73. It is easy to imagine how the controller 80 alternates switching, based on FIG. 2B.

Figure 3A:
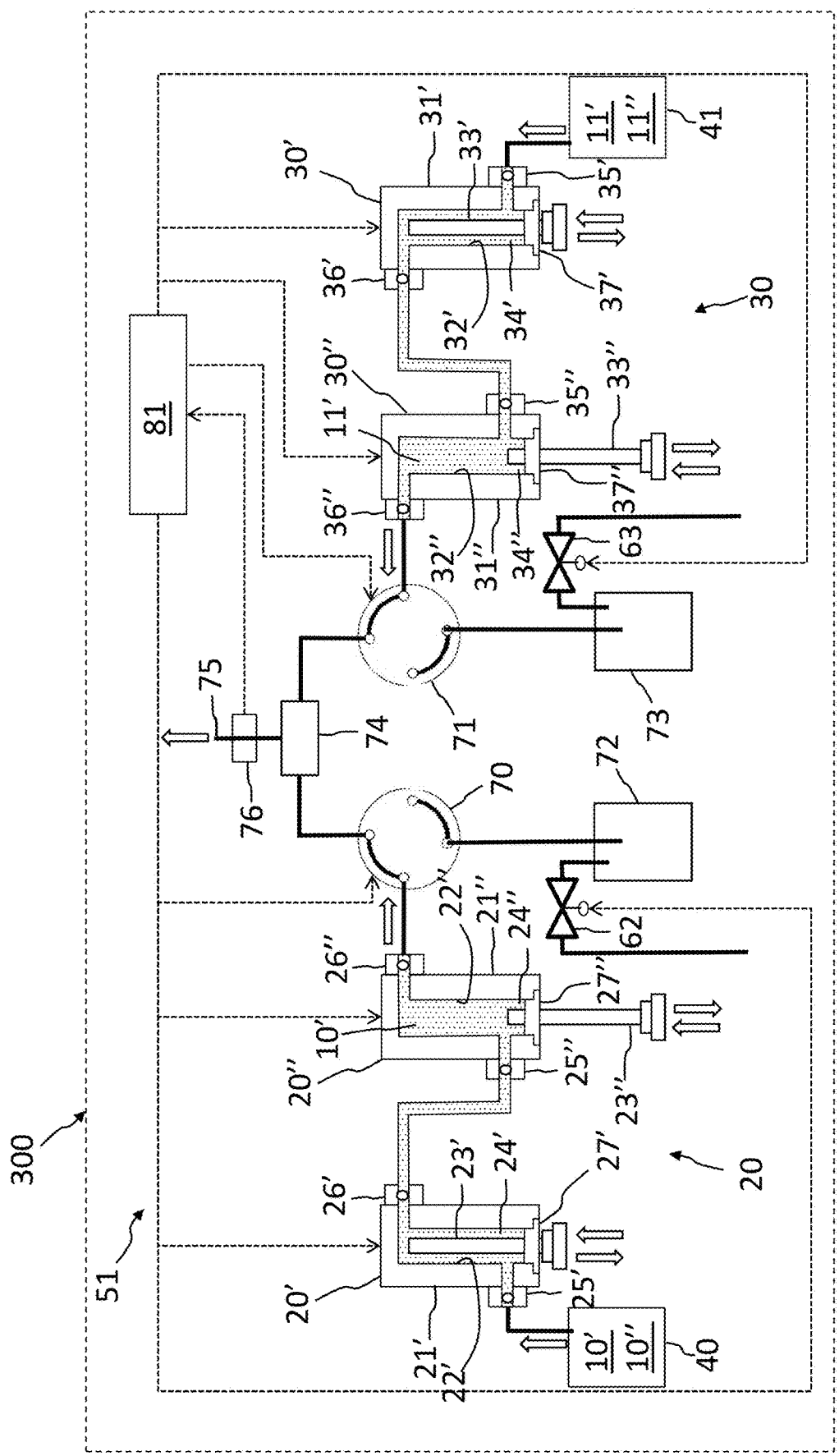
FIG. 3A shows schematically a liquid chromatographic system and a method of exchanging liquid in the liquid chromatographic system according to a second embodiment of the present disclosure.
Figure 3B:
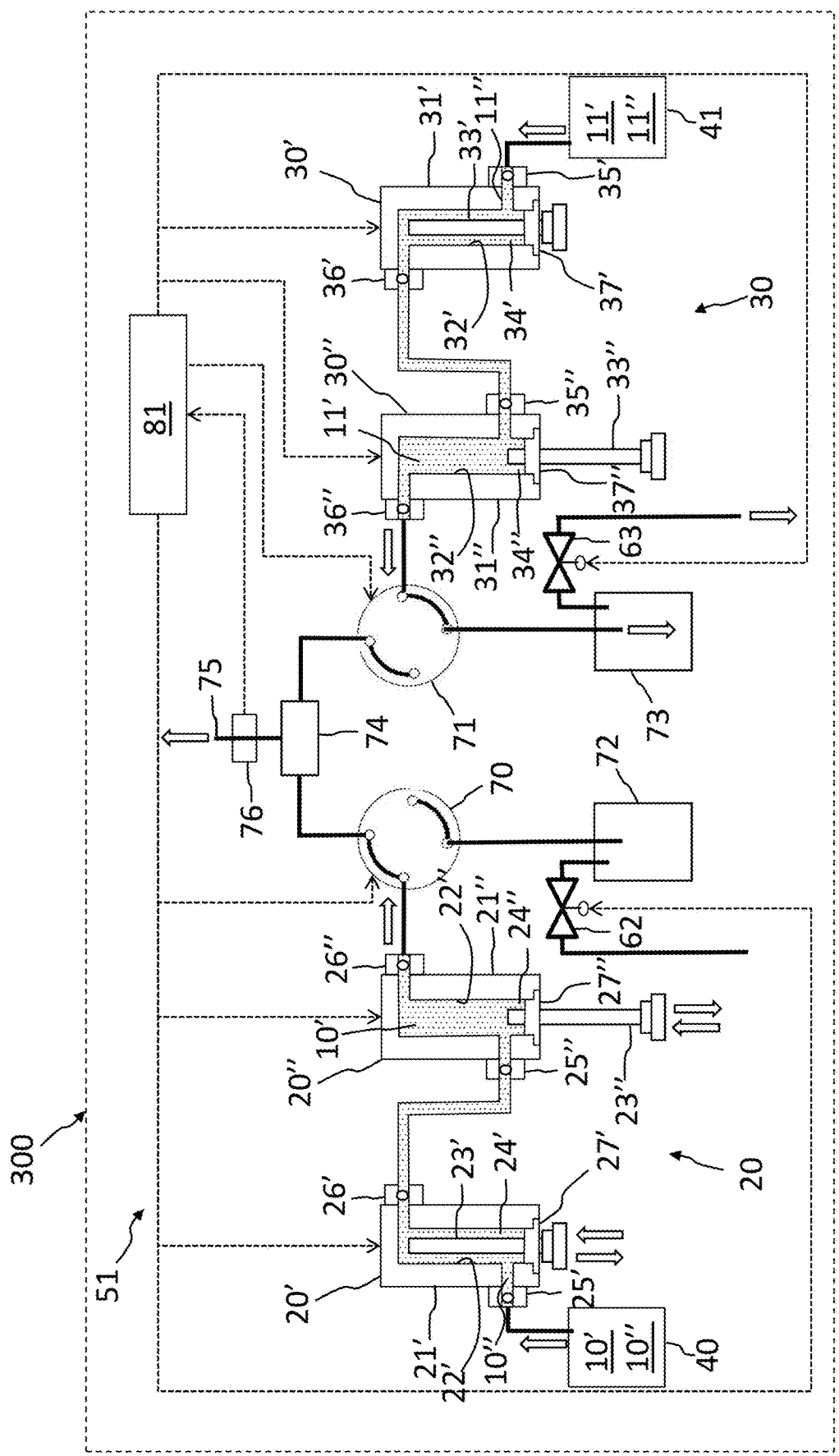
FIG. 3B is a continuation of the second embodiment of FIG. 3A.

FIGS. 3A and 3B show schematically a liquid chromatographic (LC) system 300 and a method of exchanging liquid 10', 10" with another liquid 11', 11", respectively, in the liquid chromatographic system 300 according to a second embodiment of the present disclosure.

In particular, analogously to the LC system 200 of FIGS. 2A, 2B, the LC system 300 comprises a binary liquid chromatography pump 51 comprising a first pump head 20 comprising a first primary pump head 20' and a first secondary pump head 20", and a second pump head 30 comprising a second primary pump head 30' and a second secondary pump head 30", respectively, each comprising a syringe-like cylinder body 21', 21", 31', 31", respectively, having an inner wall surface 22', 22", 32', 32" and a plunger 23', 23", 33', 33" translatable through the cylinder body 21', 21", 31', 31" leaving an interspace 24', 24", 34', 34" between the inner wall surface 22', 22", 32', 32" and the plunger 23', 23", 33', 33" when the plunger 23', 23", 33', 33" is translated through the cylinder body 21', 21", 31', 31" through a liquid-tight seal 27', 27", 37', 37", respectively.

Also, each of the primary pump heads 20', 30' and of the secondary pump heads 20", 30" comprises a one-way upstream inlet valve 25', 35', 25", 35" configured to allow liquids 10', 10", 11', 11" into the respective cylinder bodies 21', 21", 31', 31" and preventing liquids 10', 10", 11', 11" from getting out through the same valves 25', 35', 25", 35", and a one-way downstream outlet valve 26', 36', 26", 36" configured to allow liquids 10', 10", 11', 11" out of the respective cylinder bodies 21', 21", 31', 31" and preventing liquids 10', 10", 11', 11" from getting into the cylinder bodies 21', 21", 31', 31" through the same valves 26', 36', 26", 36", respectively. The downstream outlet valves 26', 36' of the primary pump heads 20', 30' are connected to the upstream inlet valves 25", 35" of the secondary pump heads 20", 30", respectively, whereas the upstream inlet valves 25', 35' of the primary pump heads 20', 30' are connected to respective liquid sources 40, 41. In this way, liquids 10', 10", 11', 11" can flow from the liquid sources 40, 41 into the primary pump heads 20', 30' through the upstream inlet valves 25', 35' of the primary pump heads 20', 30' and out of the primary pump heads 20', 30' into the secondary pump heads 20", 30" through the downstream outlet valves 26', 36' of the primary pump heads 20', 30' and the upstream inlet valves 25", 35" of the secondary pump heads 20", 30" and out of the secondary pump heads 20", 30" through the downstream outlet valves 26", 36" of the secondary pump heads 20", 30".

Just like for the LC system 200 of the previous example, the downstream outlet valve 26" of the first secondary pump head 20" and the downstream outlet valve 36" of the second secondary pump head 30" are connected to a first purge switch valve 70 and to a second purge switch valve 71, respectively, and the first and the second purge switch valves 70, 71 are individually connected to a waste 72, 73 and also to each other via a junction 74 and to an analytical input 75 via the junction 74.

The difference with respect to the LC system 200 of FIGS. 2A, 2B is that the LC system 300 comprises a first liquid-exchange pump 62 connected to the downstream outlet valve 26" of the first secondary pump head 20" via the first purge switch valve 70 and a second liquid-exchange pump 63 connected to the downstream outlet valve 36" of the second secondary pump head 30" via the second purge switch valve 71, respectively.

In particular, the first liquid-exchange pump 62 and the second liquid-exchange pump 63 are negative-pressure liquid exchange pumps configured to generate a negative-pressure (via a vacuum source) and to draw liquids 10", 11" from the respective liquid sources 40, 41 connected to the respective upstream inlet valves 25', 35' of the first primary pump head 20' and second primary pump head 30', respectively, all the way through the first and second pump heads 20, 30, respectively, thereby exchanging the liquids 10', 11' present therein.

Advantageously, the wastes 72, 73 are placed between the purge switch valves 70, 71 and the negative-pressure liquid-exchange pumps 62, 63, respectively, in order to trap liquids into the respective wastes 72, 73.

Also the LC system 300 comprises a software-driven controller 81 cooperating with a pressure sensor 76 for alternating liquid exchange between the first pump head 20 and the second pump head 30 while maintaining the pressure at the analytical input 75 constant or within a predetermined range. The controller 81 is further programmed to control operation of the first and second pump heads 20, 30 and of the liquid exchange pumps 62, 63, e.g., by sending and/or managing on/off signals and/or operational parameters like pressure, speed, time to/for each of them at specific times according to scheduled workflow steps or plan.

In particular, as it can be seen in FIG. 3B, which is a continuation of the second embodiment of FIG. 3A, the controller 81 is further programmed to alternately switch the first purge switch valve 70 and the second purge switch valve 71 in order to divert liquid from the pump head where liquid is being exchanged to waste while liquid from the other pump head continues to flow to the analytical input 75. In FIG. 2B, it is shown as example when the controller 81 switches the second purge switch valve 71 and operates the second negative-pressure liquid exchange pump 63 in order to divert liquid 11', 11" from the pump head 30 where liquid 11' is being exchanged with liquid 11" to waste 73 whereas liquid 10' from the other pump head 20 is sent to the analytical input 75 by reciprocating action of the plungers 23', 23" of the first pump head 20. In particular, the controller 81 may further regulate the liquid pressure by the first pump head 20 in order to maintain the liquid pressure at the analytical input 75 constant or within a predetermined range while liquid 11', 11" from the second pump head 30 is diverted to waste 73. It is easy to imagine how the controller 81 alternates switching, based on FIG. 3B.

Figure 4A:
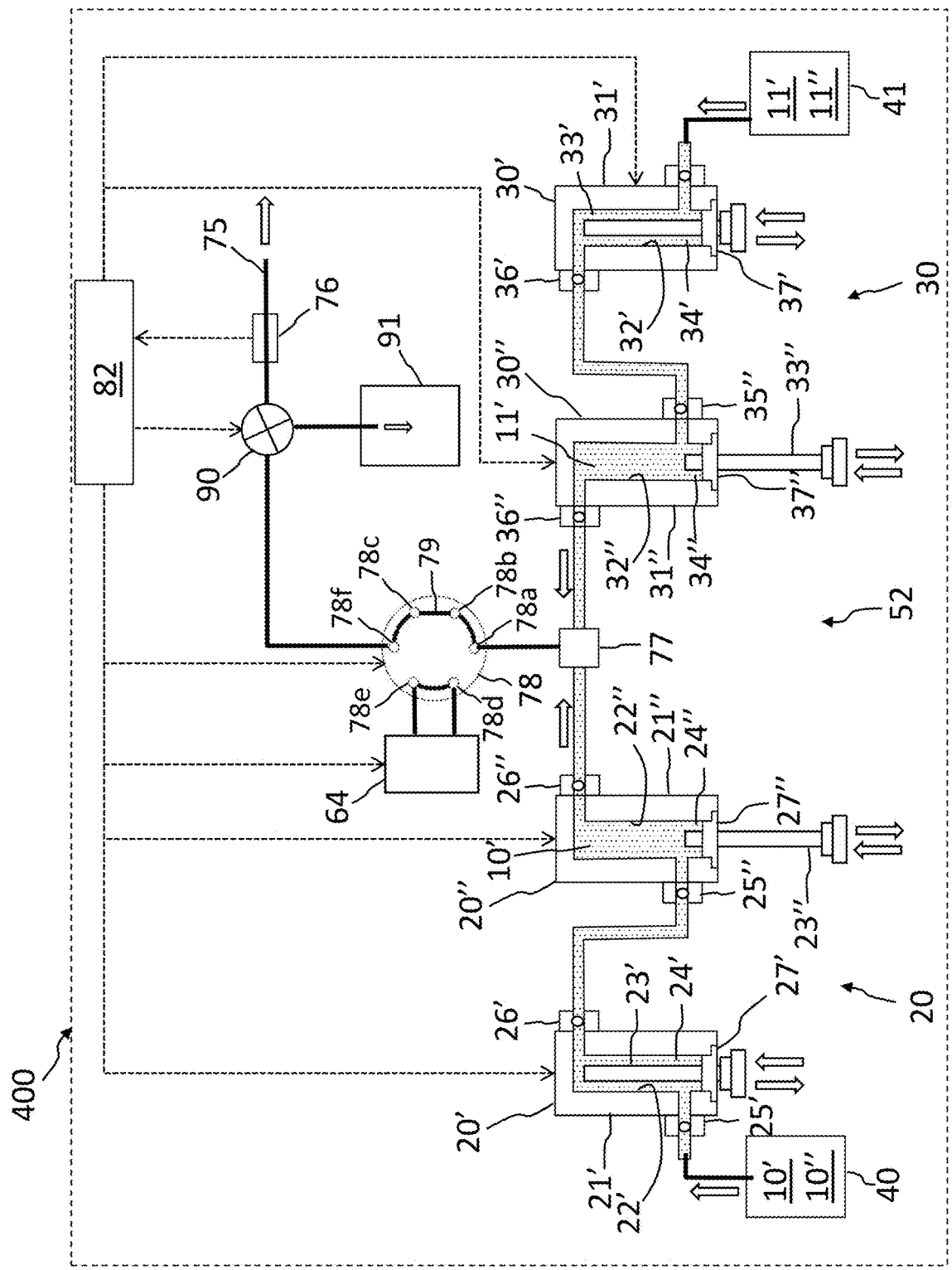
FIG. 4A shows schematically a liquid chromatographic system and a method of exchanging liquid in the liquid chromatographic system according to a third embodiment of the present disclosure.
Figure 4B:
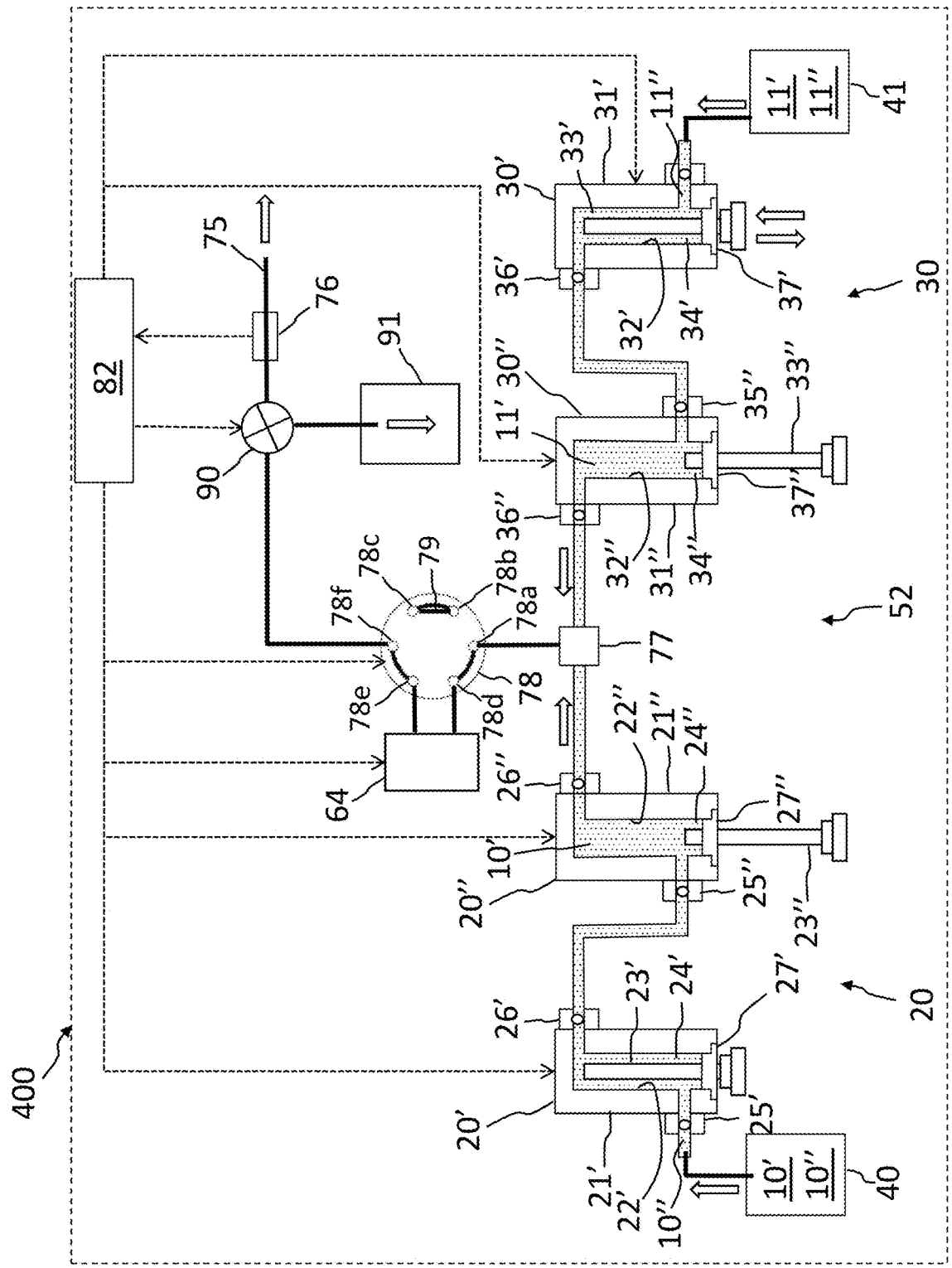
FIG. 4B is a continuation of the first embodiment of FIG. 4A.

FIGS. 4A and 4B show schematically a liquid chromatographic (LC) system 400 and a method of exchanging liquid 10', 10" with another liquid 11', 11", respectively, in the liquid chromatographic system 400 according to a third embodiment of the present disclosure.

In particular, analogously to the LC system 200 of FIGS. 2A, 2B and to the LC system 300 of FIGS. 3A, 3B, the LC system 400 comprises a binary liquid chromatography pump 52 comprising a first pump head 20 comprising a first primary pump head 20' and a first secondary pump head 20", and a second pump head 30 comprising a second primary pump head 30' and a second secondary pump head 30", respectively, each comprising a syringe-like cylinder body 21', 21", 31', 31", respectively, having an inner wall surface 22', 22", 32', 32" and a plunger 23', 23", 33', 33" translatable through the cylinder body 21', 21", 31', 31" leaving an interspace 24', 24", 34', 34" between the inner wall surface 22', 22", 32', 32" and the plunger 23', 23", 33', 33" when the plunger 23', 23", 33', 33" is translated through the cylinder body 21', 21", 31', 31" through a liquid-tight seal 27', 27", 37', 37", respectively.

Also, each of the primary pump heads 20', 30' and of the secondary pump heads 20", 30" comprises a one-way upstream inlet valve 25', 35', 25", 35" configured to allow liquids 10', 10", 11', 11" into the respective cylinder bodies 21', 21", 31', 31" and preventing liquids 10', 10", 11', 11" from getting out through the same valves 25', 35', 25", 35", and a one-way downstream outlet valve 26', 36', 26", 36" configured to allow liquids 10', 10", 11', 11" out of the respective cylinder bodies 21', 21", 31', 31" and preventing liquids 10', 10", 11', 11" from getting into the cylinder bodies 21', 21", 31', 31" through the same valves 26', 36', 26", 36", respectively. The downstream outlet valves 26', 36' of the primary pump heads 20', 30' are connected to the upstream inlet valves 25", 35" of the secondary pump heads 20", 30", respectively, whereas the upstream inlet valves 25', 35' of the primary pump heads 20', 30' are connected to respective liquid sources 40, 41. In this way, liquids 10', 10", 11', 11" can flow from the liquid sources 40, 41 into the primary pump heads 20', 30' through the upstream inlet valves 25', 35' of the primary pump heads 20', 30' and out of the primary pump heads 20', 30' into the secondary pump heads 20", 30" through the downstream outlet valves 26', 36' of the primary pump heads 20', 30' and the upstream inlet valves 25", 35" of the secondary pump heads 20", 30" and out of the secondary pump heads 20", 30" through the downstream outlet valves 26", 36" of the secondary pump heads 20", 30".

However, unlike the LC systems 200, 300 of the previous examples, in the LC system 400 the downstream outlet valve 26" of the first secondary pump head 20" and the downstream outlet valve 36" of the second secondary pump head 20" are connected via a junction 77 to a common purge switch valve 78, the common purge switch valve 78 comprising a junction inlet port 78a connected to the junction 77, two bypass ports 78b, 78c interconnected by a bypass fluidic path 79, and two liquid-exchange pump ports 78d, 78e interconnected by a common liquid exchange pump 64 and an output port 78f.

The output port 78f is connected to a flow splitter 90 for diverting part of the liquid to waste 91 and part of the liquid to the analytical input 75.

The common liquid-exchange pump 64 is a negative-pressure liquid exchange pump configured to generate a negative-pressure and to draw liquids 10", 11" from the respective liquid sources 40, 41 connected to the respective upstream inlet valves 25', 35' of the first primary pump head 20' and second primary pump head 30', respectively, all the way through the first and second pump heads 20, 30, respectively, thereby exchanging the liquids 10', 11' present therein.

Also the LC system 400 comprises a software-driven controller 82 cooperating with a pressure sensor 76 and programmed to regulate the flow splitter 90 for enabling simultaneous liquid exchange at both the first pump head 20 and the second pump head 30 while maintaining the pressure at the analytical input 75 constant or within a predetermined range.

In particular, as it can be seen in conjunction with FIG. 4B, which is a continuation of the third embodiment of FIG. 4A, the controller 82 is further programmed to switch the common purge switch valve 78 in order to alternately connect the junction inlet port 78a and the output port 78f via the bypass ports 78b, 78c (FIG. 4A) and via the liquid-exchange pump ports 78d, 78e (FIG. 4B), respectively, and, at the same time, based on pressure feedback from the pressure sensor 76 can vary the relative flow rate between the analytical input 75 and the waste 91 in order to maintain the liquid pressure at the analytical input 75 constant or within a predetermined range. This is achieved by controlling the operation of the first and second pump heads 20, 30, of the common liquid exchange pump 64, the flow splitter 90 and the common purge switch valve 78, e.g., by sending and/or managing on/off signals and/or operational parameters like pressure, speed, time to/for each of them at specific times according to scheduled workflow steps or plan.

In the preceding specification, numerous specific details are set forth in order to provide a thorough understanding of the present disclosure. It will be apparent, however, to one having ordinary skill in the art, that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the invention may be practiced otherwise than as specifically devised in the above examples.

Reference throughout the preceding specification to "one embodiment", "an embodiment", "one example" or "an example", means that a particular feature, structure or characteristic described in connection with the embodiment or example is included in at least one embodiment. Thus, appearances of the phrases "in one embodiment", "in an embodiment", "one example" or "an example", in various places throughout this specification are not necessarily all referring to the same embodiment or example.

Furthermore, the particular features, structures, or characteristics may be combined in any suitable combinations and/or sub-combinations in one or more embodiments or examples.

What is claimed is:

1. A liquid chromatographic (LC) system comprising a liquid chromatography pump comprising at least one pump head comprising a primary pump head and a secondary pump head, each comprising a syringe-like cylinder body having an inner wall surface and a plunger translatable through the cylinder body leaving an interspace between the inner wall surface and the plunger when the plunger is translated through the cylinder body, an upstream inlet valve configured to allow liquid into the cylinder body and a downstream outlet valve configured to allow liquid out of the cylinder body, the downstream outlet valve of the primary pump head being connected to the upstream inlet valve of the secondary pump head, and wherein the LC system further comprises at least one liquid-exchange pump connected either to the upstream inlet valve of the primary pump head or to the downstream outlet valve of the secondary pump head, wherein said at least one liquid-exchange pump is configured for exchanging a liquid present in the cylinder bodies of the primary and the secondary pump heads with another liquid by purging through the interspaces left between the inner wall surfaces of the cylinder bodies and the plungers, respectively.

2. The LC system according to claim 1, wherein the liquid chromatography pump is a binary pump comprising a first pump head comprising a first primary pump head and a first secondary pump head, and a second pump head comprising a second primary pump head and a second secondary pump head, respectively, and wherein the downstream outlet valve of the first secondary pump head and the downstream outlet valve of the second secondary pump head are connected to a first purge switch valve and to a second purge switch valve, respectively, and the first and the second purge switch valves are individually connected to a waste and also to each other via a junction and to an analytical input via the junction.

3. The LC system according to claim 2 further comprising a first positive-pressure liquid-exchange pump connected to the upstream inlet valve of the first primary pump head and a second positive-pressure liquid-exchange pump connected to the upstream inlet valve of the second primary pump head, respectively.

4. The LC system according to claim 2 further comprising a first negative-pressure liquid-exchange pump connected to the downstream outlet valve of the first secondary pump head via the first purge switch valve and a second negative-pressure liquid-exchange pump connected to the downstream outlet valve of the second secondary pump head via the second purge switch valve, respectively.

5. The LC system according to claim 2 further comprising a software-driven controller cooperating with a pressure sensor for alternating liquid exchange between the first pump head and the second pump head while maintaining the pressure at the analytical input constant or within a predetermined range.

6. The LC system according to claim 5, wherein the controller is programmed to switch the first purge switch valve and the second purge switch valve in order to divert liquid from the pump head where liquid is being exchanged to waste and liquid from the other pump head to the analytical input.

7. The LC system according to claim 1, wherein the liquid chromatography pump is a binary pump comprising a first pump head comprising a first primary pump head and a first secondary pump head, and a second pump head comprising a second primary pump head and a second secondary pump head, respectively, and wherein the downstream outlet valve of the first secondary pump head and the downstream outlet valve of the second secondary pump head are connected via a junction to a common purge switch valve, the common purge switch valve comprising a junction inlet port connected to the junction, two bypass ports interconnected by a bypass fluidic path, two liquid-exchange pump ports interconnected by a common liquid exchange pump, and an output port.

8. The LC system according to claim 7, wherein the output port is connected to a flow splitter for diverting part of the liquid to waste and part of the liquid to an analytical input.

9. The LC system according to claim 8 further comprising a software-driven controller cooperating with a pressure sensor and programmed to regulate the flow splitter for enabling simultaneous liquid exchange at both the first pump head and the second pump head while maintaining the pressure at the analytical input constant or within a predetermined range.

10. The LC system according to claim 9, wherein the controller is further programmed to switch the common purge switch valve in order to alternately connect the junction inlet port and the output port via the bypass ports and via the liquid-exchange pump ports, respectively.

11. A method of exchanging a liquid in a liquid chromatographic (LC) system comprising a liquid chromatography pump comprising at least one pump head comprising a primary pump head and a secondary pump head, each comprising a syringe-like cylinder body having an inner wall surface and a plunger translatable through the cylinder body leaving an interspace between the inner wall surface and the plunger when the plunger is translated through the cylinder body, an upstream inlet valve configured to allow liquid into the cylinder body and a downstream outlet valve configured to allow liquid out of the cylinder body, the downstream outlet valve of the primary pump head being connected to the upstream inlet valve of the secondary pump head, the method comprising exchanging the liquid present in the cylinder bodies of the primary and the secondary pump heads with another liquid by purging through the interspaces left between the inner wall surfaces of the cylinder bodies and the plungers, respectively, by at least one liquid-exchange pump connected either to the upstream inlet valve of the primary pump head, or to the downstream outlet valve of the secondary pump head.

12. The method according to claim 11, wherein the liquid chromatography pump is a binary pump comprising a first pump head comprising a first primary pump head and a first secondary pump head, and a second pump head comprising a second primary pump head and a second secondary pump head, respectively, and wherein the downstream outlet valve of the first secondary pump head and the downstream outlet valve of the second secondary pump head are connected to a first purge switch valve and to a second purge switch valve, respectively, and the first and the second purge switch valves are individually connected to a waste and also to each other via a junction and to an analytical input via the junction, the method comprising alternating liquid exchange between the first pump head and the second pump head while maintaining the pressure at the analytical input constant or within a predetermined range by a software-driven controller cooperating with a pressure sensor.

13. The method according to claim 12 further comprising switching the first purge switch valve and the second purge switch valve in order to divert liquid from the pump head where liquid is being exchanged to waste and liquid from the other pump head to the analytical input.

14. The method according to claim 11, wherein the liquid chromatography pump is a binary pump comprising a first pump head comprising a first primary pump head and a first secondary pump head, and a second pump head comprising a second primary pump head and a second secondary pump head, respectively, and wherein the downstream outlet valve of the first secondary pump head and the downstream outlet valve of the second secondary pump head are connected via a junction to a common purge switch valve, the common purge switch valve comprising a junction inlet port connected to the junction, two bypass ports interconnected by a bypass fluidic path, two liquid-exchange pump ports interconnected by a common liquid exchange pump, and an output port connected to a flow splitter for diverting part of the liquid to waste and part of the liquid to an analytical input, the method comprising regulating the flow splitter for enabling simultaneous liquid exchange at both the first pump head and the second pump head while maintaining the pressure at the analytical input constant or within a predetermined range by a software-driven controller cooperating with a pressure sensor.

15. The method according to claim 14 further comprising switching the common purge switch valve in order to alternately connect the junction inlet port and the output port via the bypass ports and via the liquid-exchange pump ports, respectively.

* * * * *